Figure 1:
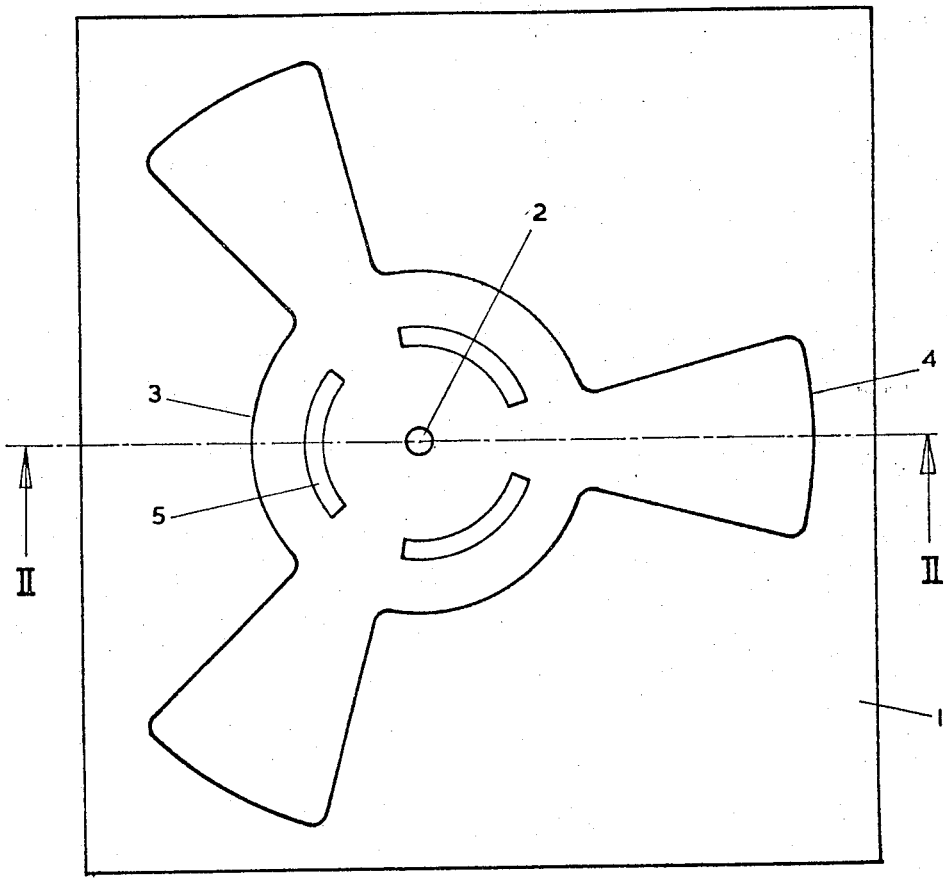
Figure 2:
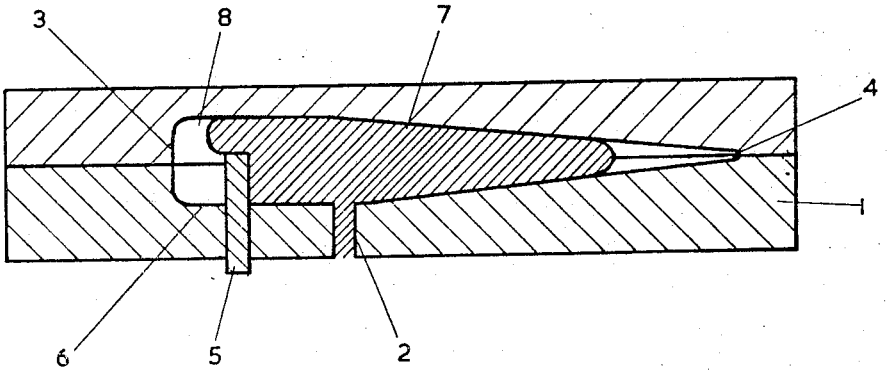
Figure 3:
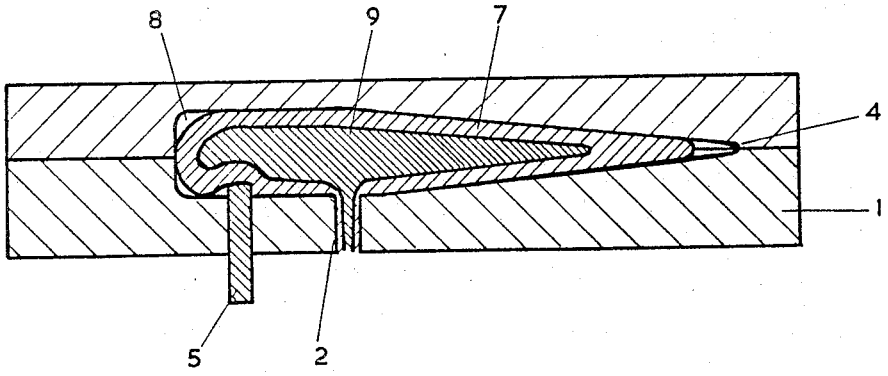
Figure 4:
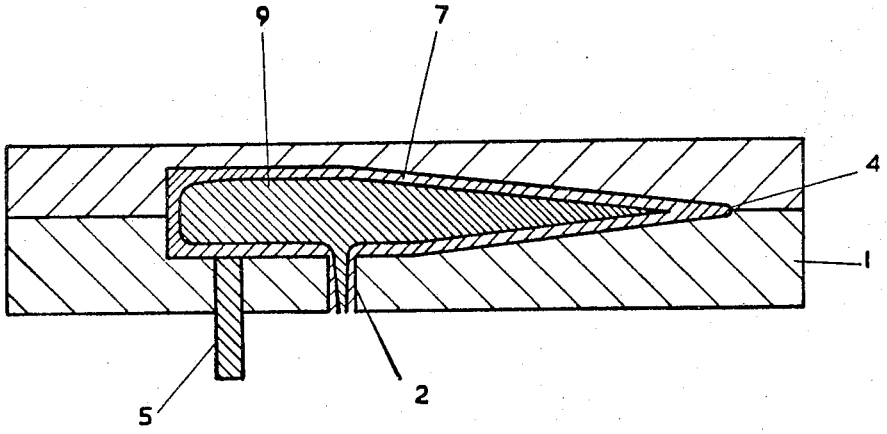
Figure 5:
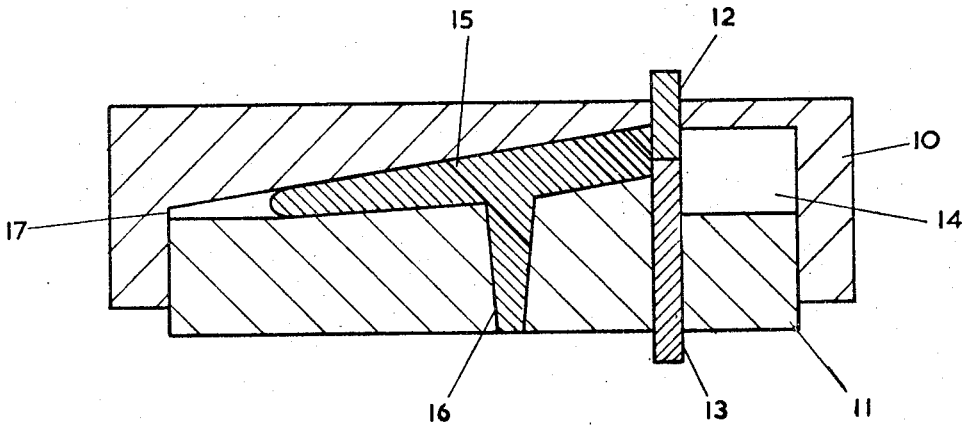
Figure 6:
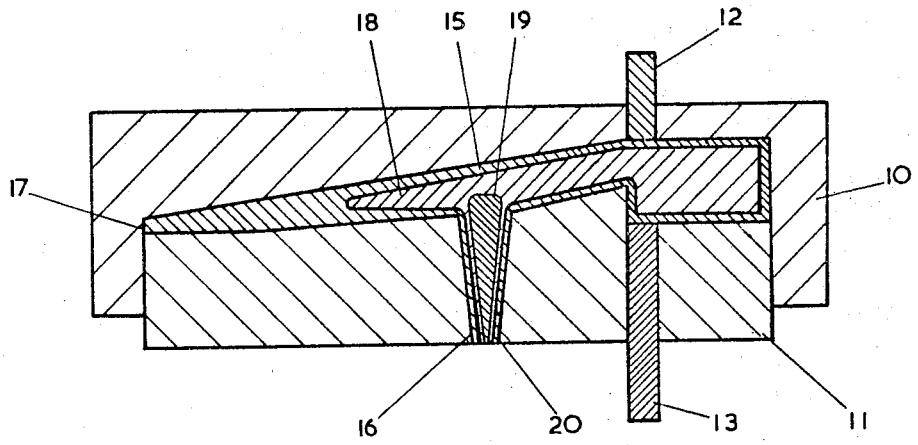
Figure 7:
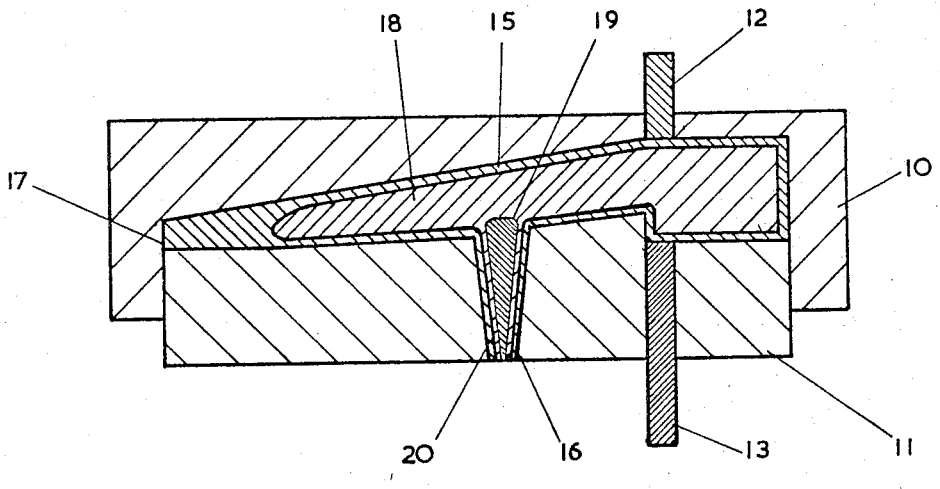
Figure 8:
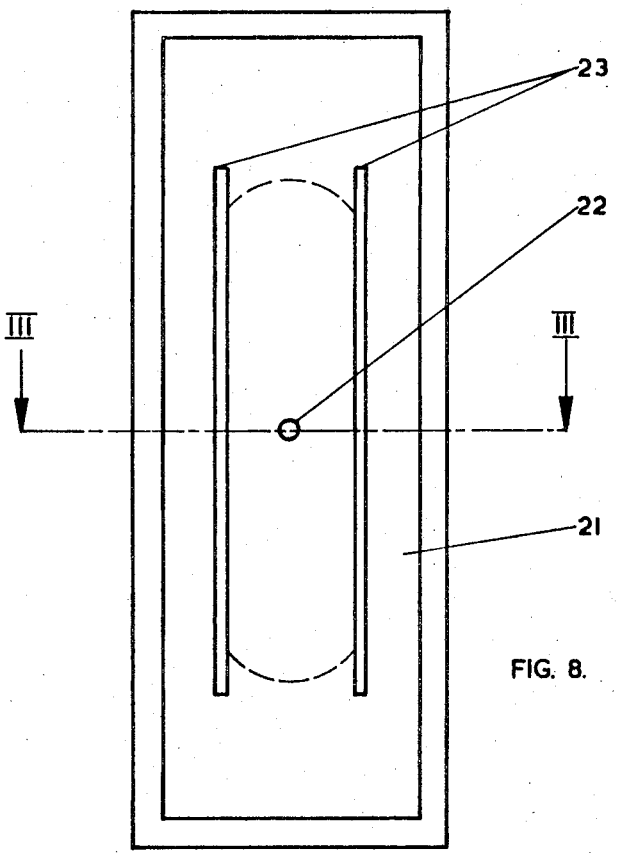
Figure 9:
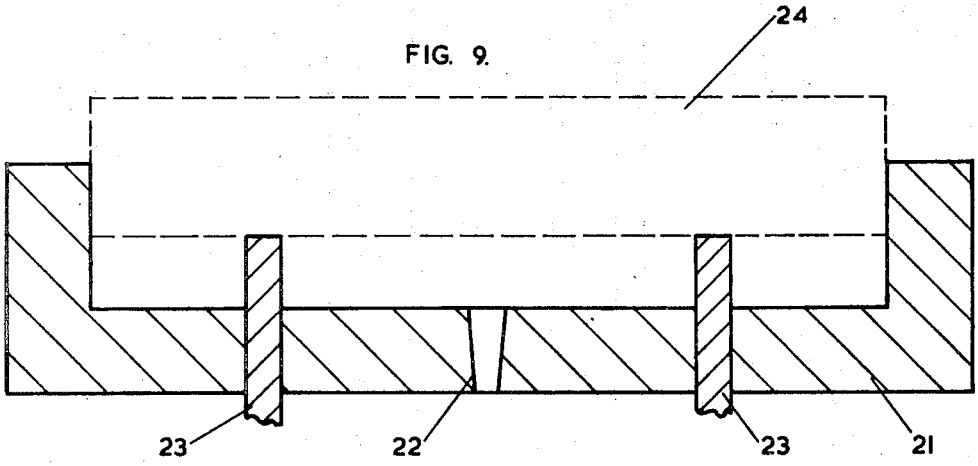

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MAY 7, 1974

922 O.G. 10

T922,007
INJECTION MOULDING
Alan George Smith, Harrow, England, assignor to Imperial Chemical Industries Limited, London, England
Filed Apr. 5, 1973, Ser. No. 348,143
Claims priority, application Great Britain, Apr. 20, 1972, 18,378/72
Int. Cl. B29d *27/00*
U.S. Cl. 264—55
5 Sheets Drawing. 18 Pages Specification

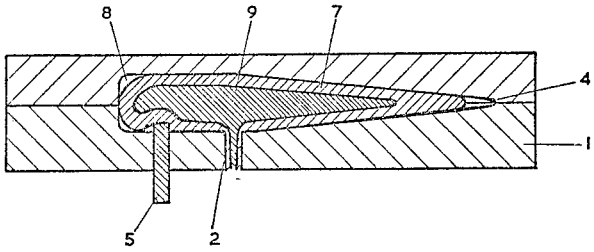

Injection moulding process with sequential injection of dissimilar materials into a mould cavity defined by at least two mould members in at least one of which a retractable member is slidably mounted, the retractable member being initially in the non retracted position, preferably protruding beyond the surface of the mould member into the cavity, and said member being retracted before or during injection of the second material but before the mould cavity is filled. This enables the distribution of the first and second materials inside the mould cavity to be modified.

INJECTION MOULDING

Filed April 5, 1973 5 Sheets-Sheet 1

INJECTION MOULDING

Filed April 5, 1973 5 Sheets-Sheet 2

INJECTION MOULDING

Filed April 5, 1973 5 Sheets-Sheet 3

INJECTION MOULDING

Filed April 5, 1973 5 Sheets-Sheet 5